(12) United States Patent
Wang

(10) Patent No.: US 8,549,814 B2
(45) Date of Patent: Oct. 8, 2013

(54) BAMBOO FRAME MEMBER MOUNTING STRUCTURE

(76) Inventor: Wen-Tsan Wang, Taipei (TW)

( * ) Notice: Subject to any disclaimer, the term of this patent is extended or adjusted under 35 U.S.C. 154(b) by 227 days.

(21) Appl. No.: 12/890,713

(22) Filed: Sep. 27, 2010

(65) Prior Publication Data

US 2012/0076976 A1  Mar. 29, 2012

(51) Int. Cl.
*E04H 12/02* (2006.01)
*E04H 12/06* (2006.01)

(52) U.S. Cl.
USPC .................. 52/653.1; 52/648.1; 52/655.1

(58) Field of Classification Search
USPC ............. 52/79.1–79.5, 287.1, 233, 261, 831,
52/836, 843, 847, 745.19, 747.1, 633, 637,
52/653.1, 648.1, 656.1, 341, 376, 646,
52/649.1, 650.1, 651.1, 652.1, 655.1;
403/341, 376
See application file for complete search history.

(56) References Cited

U.S. PATENT DOCUMENTS

| | | | | |
|---|---|---|---|---|
| 1,504,527 A * | 8/1924 | Stegall | ............................ | 52/92.2 |
| 2,340,551 A * | 2/1944 | Morrison et al. | ............... | 267/80 |
| 2,371,329 A * | 3/1945 | Hirsch | ............................ | 403/217 |
| 3,502,359 A * | 3/1970 | Lucci | ............................ | 403/267 |
| 3,507,066 A * | 4/1970 | Widigs | ............................ | 40/732 |
| 4,122,739 A * | 10/1978 | Marlow | ............................ | 83/421 |
| 4,191,000 A * | 3/1980 | Henderson | ....................... | 52/837 |
| 4,229,915 A * | 10/1980 | Snow et al. | ..................... | 52/92.2 |
| 5,826,399 A * | 10/1998 | Dahl | ............................ | 52/745.1 |
| 6,132,129 A * | 10/2000 | Frazier | ......................... | 403/219 |
| 7,395,999 B2 * | 7/2008 | Walpole | .......................... | 249/33 |
| 2009/0232593 A1 * | 9/2009 | Wang | ............................ | 403/341 |

FOREIGN PATENT DOCUMENTS

GB  2302500 A  *  1/1997

* cited by examiner

*Primary Examiner* — Jeanette E. Chapman

(74) *Attorney, Agent, or Firm* — Leong C. Lei

(57) ABSTRACT

A bamboo frame member mounting structure includes multiple bamboo frame members that are respectively bonded to one another at a predetermined angle with an adhesive, one or a plurality of pin holes obliquely extending through each bamboo frame member, and one or a number of pins peripherally coated with a layer of an adhesive and respectively fitted into the pin hole or pin holes on each of two bonded bamboo frame members to enhance the connection of each two bonded bamboo frame members.

4 Claims, 11 Drawing Sheets

BAMBOO FRAME MEMBER MOUNTING STRUCTURE

BACKGROUND OF THE INVENTION a) Field of the Invention

The present invention relates to bamboo furniture making technology and more specifically, to a bamboo frame member mounting structure for making bamboo furniture.

b) Description of the Prior Art

Many different materials, such as wood, plastics, metal and etc. may be used for making storage boxes, cabinets and other furniture. For the advantage of eco-friendly characteristic, high durability, easy to clean and nice looking, bamboo and wood furniture are highly invited.

A regular bamboo furniture includes a frame structure formed by connecting multiple bamboo frame members together. These bamboo frame members may be made in either of the following two ways:

The first way is to cut a bamboo pole into small bamboo strips, and then to press-bonding multiple bamboo strips with an adhesive into a bamboo plate, and then to cut the bamboo plate into bamboo frame members subject to the desired shape and size.

The second way is to crush a bamboo pole into a bamboo paste, and then to mix the bamboo paste thus obtained with an adhesive, and then to mold the mixture thus obtained into a boom plate through a hot press molding technique, and then to cut the bamboo plate into bamboo frame members subject to the desired shape and size.

When connecting two bamboo frame members together during construction of a bamboo furniture, an adhesive is usually used to bond the two bamboo frame members together, and then a nail is obliquely driven into the two bonded bamboo frame members to enhance the connection. Alternatively, a pin hole may be made on each of two bamboo frame members at a predetermined angle, for example, perpendicular to the longitudinal axis of each of two bamboo frame members, and then a pin is coated with a layer of an adhesive and then fitted with its two opposite ends into the pin hole on each of the two bamboo frame members to connect the two bamboo frame members firmly together.

However, the bamboo frame structure constructed according to the aforesaid prior art design is not durable in use. When the bamboo furniture receives an impact or external pressure, more particularly the pressure comes in a direction parallel to the extending direction of the pin, the pin may be forced out of the respective bamboo frame member, resulting in collapse of the bamboo furniture.

SUMMARY OF THE INVENTION

The present invention has been accomplished under the circumstances in view. It is one object of the present invention to provide a bamboo frame member mounting structure, which enhances the connection of each two bamboo frame members, avoiding disconnection or loosening of each two connected bamboo frame members upon an impact or external pressure.

The main technical feature of the present invention is the installation of a pin in two mating bamboo frame members at a predetermined angle such that any pressure applied to the pin will be evenly distributed through the two connected bamboo frame members, enhancing the connection between the two bamboo frame members and avoiding disconnection of the pin from the bamboo frame members.

To achieve this and other objects of the present invention, a bamboo frame member mounting structure comprises a plurality of bamboo frame members for making a bamboo storage device, a plurality of pin holes respectively located on and obliquely extending through said bamboo frame members at a predetermined angle, and a plurality of pins respectively coated with a layer of an adhesive and then fitted into the pin holes to join the bamboo frame members together. Each pin hole is fitted into a pin hole on one bamboo frame member and a pin hole on another bamboo frame member to connect the two bamboo frame members together.

In one bamboo frame member connection example of the present invention, one bamboo frame member has one end thereof perpendicularly connected to one end of another bamboo frame member by one or two of the pins.

In another bamboo frame member connection example of the present invention, one bamboo frame member has one end thereof perpendicularly connected to the periphery of another bamboo frame member by one or two of the pins.

In still another bamboo frame member connection example of the present invention, one bamboo frame member has a beveled end connected to a beveled end of another bamboo frame member by one or two of the pins.

In still another bamboo frame member connection example of the present invention, one bamboo frame member has one flat end thereof perpendicularly connected to the periphery of one flat end of another said bamboo frame member by one or two of the pins.

In still another bamboo frame member connection example of the present invention, two said pins are respectively fitted into two pin holes being respectively obliquely extending through each of two mating bamboo frame members at different angles.

In still another bamboo frame member connection example of the present invention, two pins are respectively fitted into two pin holes being respectively extending through each of two bamboo frame members in a crossed manner.

In still another bamboo frame member connection example of the present invention, two pins are respectively fitted into two pin holes being respectively extending through each of two bamboo frame members in a symmetric manner.

Subject to the application of the present invention, each pin in the bamboo frame structure can bear a high pressure that comes either from horizontal, vertical, or any other direction, avoiding disconnection of bamboo frame members and enhancing the strength of the bamboo furniture.

DETAILED DESCRIPTION OF THE PREFERRED EMBODIMENT

Figure 1:
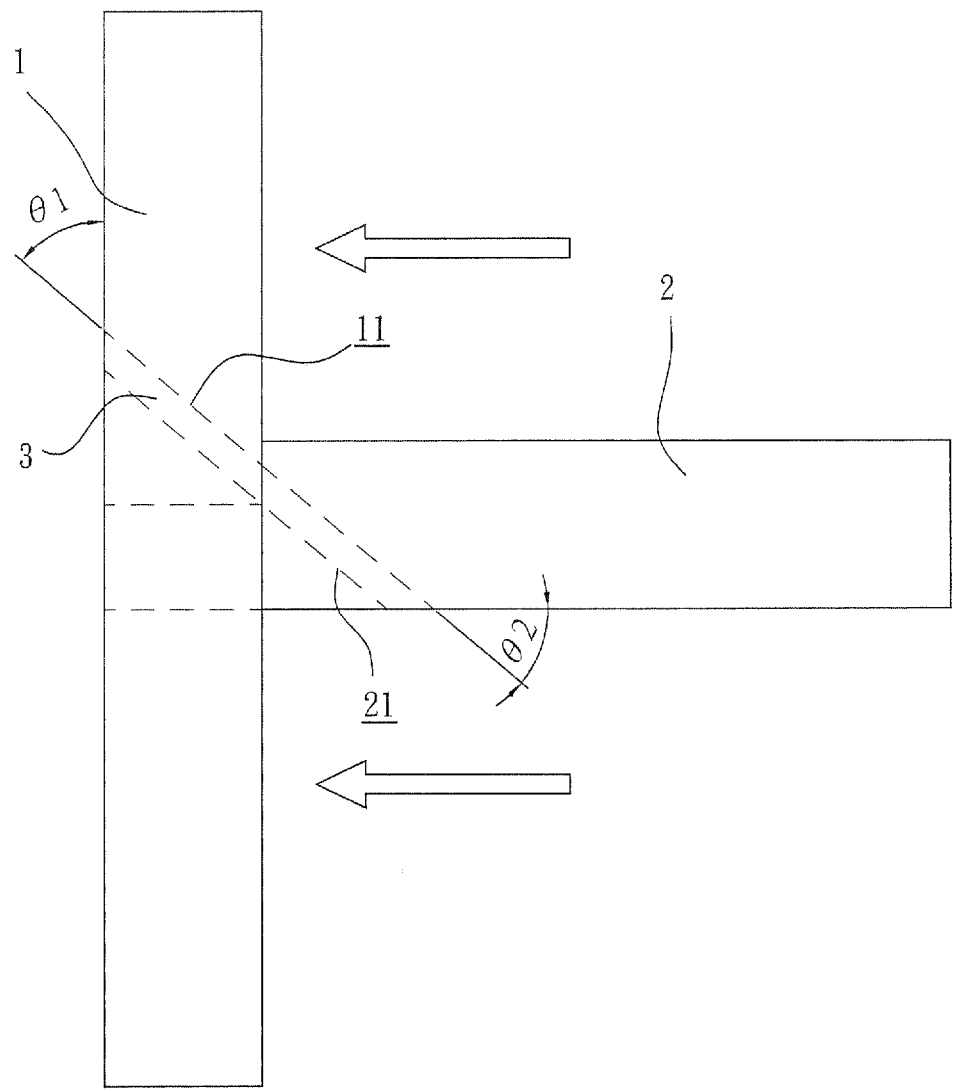
FIG. 1 is a schematic drawing illustrating a bamboo frame member mounting structure in accordance with a first embodiment of the present invention.

Referring to FIG. 1, a bamboo frame member mounting structure in accordance with a first embodiment of the present invention is shown comprising a first bamboo frame member 1 and a second bamboo frame member 2. The second bamboo frame member 2 has its one end perpendicularly bonded to the periphery of the first bamboo frame member 1 with an adhesive (not shown). A drill or machine tool is then used to make a first pin hole 11 and a second pin hole 21 obliquely through the first bamboo frame member 1 and the second bamboo frame member 2, keeping the first pin hole 11 and the second pin hole 21 in axial alignment, where the first pin hole 11 defines with the periphery of the first bamboo frame member 1 a first contained angle $\theta 1$; the second pin hole 21 defines with the periphery of the second bamboo frame member 2 a second contained angle $\theta 2$. Thereafter, a pin 3 is peripherally coated with a layer of an adhesive (not shown) and then fitted into the first pin hole 11 on the first bamboo frame member 1 and the second pin hole 21 on the second bamboo frame member 2 to enhance connection between the first bamboo frame member 1 and the second bamboo frame member 2. The frame structure thus made can be used in a bamboo basket or any bamboo storage container. When the frame structure receives a pressure during application of the bamboo basket or storage container (see the arrowhead signs in FIG. 1), the obliquely installed pin 3 bears the pressure against damage.

Figure 2:
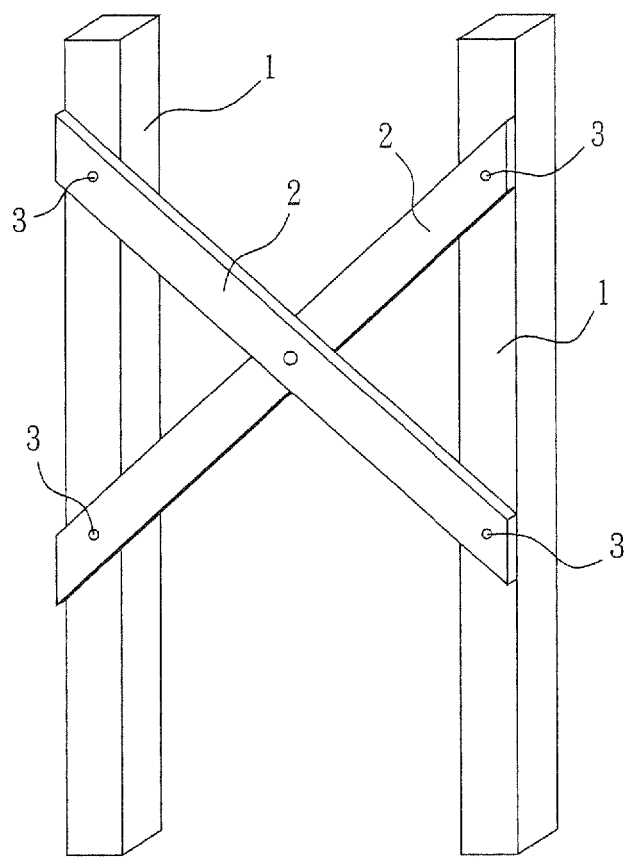
FIG. 2 is a schematic front view of a bamboo frame member mounting structure in accordance with a second embodiment of the present invention.
Figure 2A:
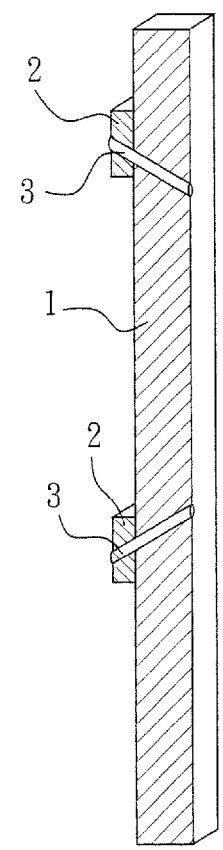
FIG. 2A is a sectional view of a part of FIG. 2.

Referring to FIGS. 2 and 2A, a bamboo frame member mounting structure in accordance with a second embodiment of the present invention is shown comprising two first bamboo frame members 1 and two second bamboo frame members 2. The second bamboo frame members 2 are pivotally connected together in a crossed manner, and then the ends of the second bamboo frame members 2 are respectively bonded to the periphery of each of the two first bamboo frame members 1 with an adhesive (not shown), keeping the two first bamboo frame members 1 in parallel. A drill or machine tool is then used to make a first pin hole (not shown) obliquely on each end of each first bamboo frame member 1 and a respective axially aligned mating second pin hole (not shown) on the associating second bamboo frame member 2. Thereafter, a respective pin 3 is respectively peripherally coated with a layer of an adhesive (not shown) and then respectively fitted into the first pin hole on each of the two distal ends of each of the two first bamboo frame members 1 and the associating second pin hole on each of the two second bamboo frame members 2 to enhance connection between the first bamboo frame members 1 and the second bamboo frame members 2.

Figure 3:
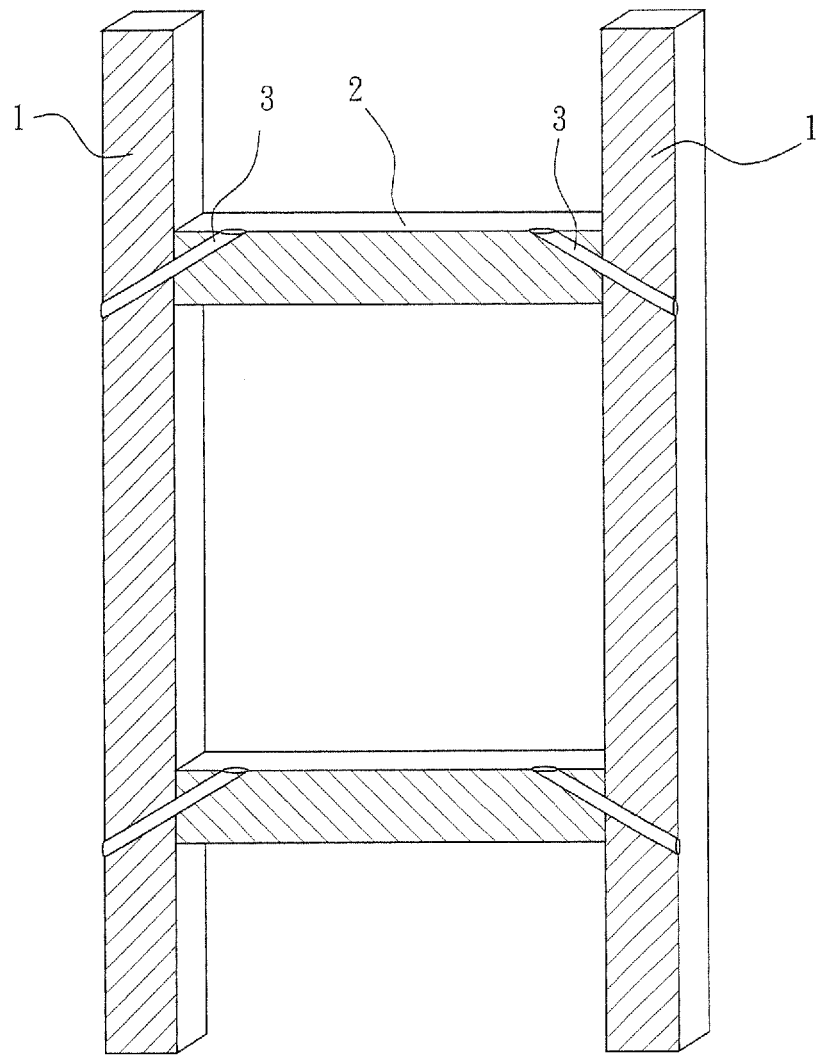
FIG. 3 is a sectional view of a bamboo frame member mounting structure in accordance with a third embodiment of the present invention.

Referring to FIG. 3, a bamboo frame member mounting structure in accordance with a third embodiment of the present invention is shown comprising two first bamboo frame members 1 and two second bamboo frame members 2. The two opposite ends of each of the two second bamboo frame members 2 are respectively perpendicularly bonded to the second bamboo frame members 2 with an adhesive (not shown) to keep the two first bamboo frame members 1 in parallel. A drill or machine tool is then used to make a first pin hole (not shown) obliquely on each end of each first bamboo frame member 1 and an axially aligned mating second pin hole (not shown) on the associating second bamboo frame member 2. Thereafter, a respective pin 3 is respectively peripherally coated with a layer of an adhesive (not shown) and then respectively fitted into the first pin hole on each of the two distal ends of each of the two first bamboo frame members 1 and the associating second pin hole on each of the two second bamboo frame members 2 to enhance connection between the first bamboo frame members 1 and the second bamboo frame members 2.

Figure 4:
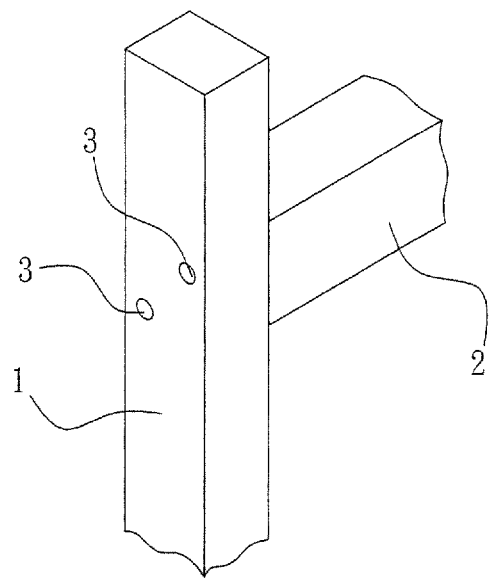
FIG. 4 is an oblique elevation of a bamboo frame member mounting structure in accordance with a fourth embodiment of the present invention.
Figure 4A:
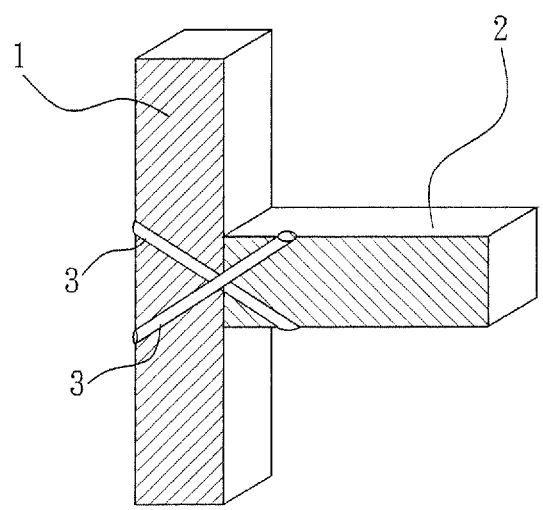
FIG. 4A is a sectional side view of FIG. 4.

Referring to FIGS. 4 and 4A, a bamboo frame member mounting structure in accordance with a fourth embodiment of the present invention is shown comprising a first bamboo frame member 1 and a second bamboo frame member 2. The second bamboo frame member 2 has its one end perpendicularly bonded to the periphery of the first bamboo frame member 1 with an adhesive (not shown). A drill or machine tool is then used to make two first pin holes 11 and two second pin holes 21 obliquely through the first bamboo frame member 1 and the second bamboo frame member 2, keeping the respective second pin holes 21 in axial alignment with the respective first pin holes 11, where one connected first pin hole 11 and second pin hole 21 extends in a cross manner relative to the other connected first pin hole 11 and second pin hole 21 without contact. Thereafter, two pins 3 are respectively peripherally coated with a layer of an adhesive (not shown) and then fitted into one respective set of connected first pin hole 11 and second pin hole 21 to enhance connection between the first bamboo frame member 1 and the second bamboo frame member 2.

Figure 5:
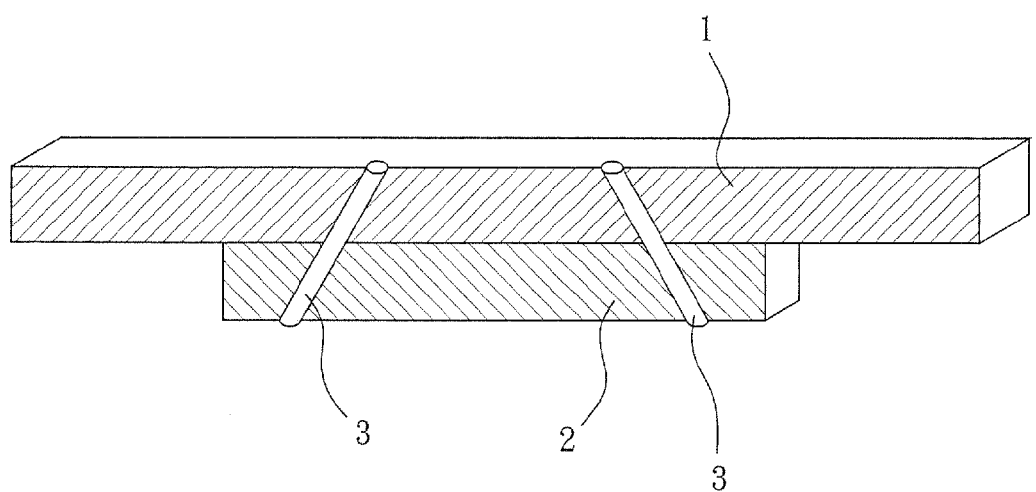
FIG. 5 is a sectional side view of a bamboo frame member mounting structure in accordance with a fifth embodiment of the present invention.

Referring to FIG. 5, a bamboo frame member mounting structure in accordance with a fifth embodiment of the present invention is shown comprising a first bamboo frame member 1 and a second bamboo frame member 2. The second bamboo frame member 2 is peripherally bonded to the periphery of the first bamboo frame member 1 with an adhesive (not shown). A drill or machine tool is then used to make two pin holes obliquely through the first bamboo frame member 1 and the second bamboo frame member 2 in a non-parallel manner, and then two pins 3 are respectively peripherally coated with a layer of an adhesive (not shown) and then fitted into the pin holes to enhance connection between the first bamboo frame member 1 and the second bamboo frame member 2.

Figure 6:
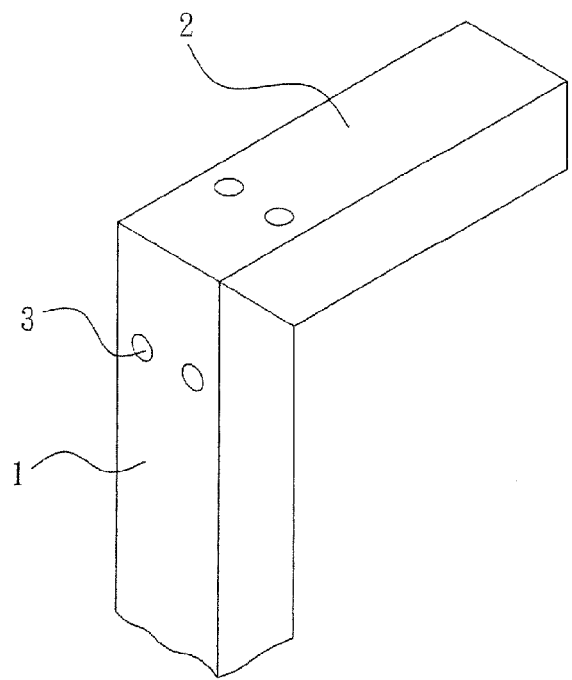
FIG. 6 is an oblique elevation of a bamboo frame member mounting structure in accordance with a sixth embodiment of the present invention.
Figure 6A:
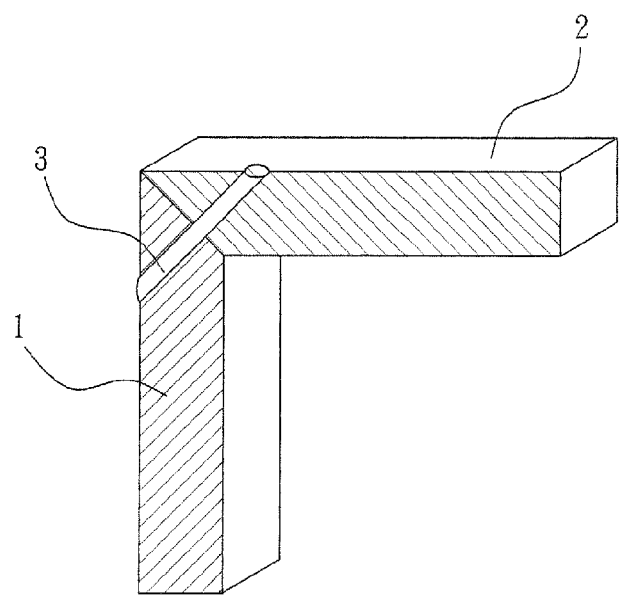
FIG. 6A is a sectional side view of FIG. 6.

Referring to FIGS. 6 and 6A, a bamboo frame member mounting structure in accordance with a sixth embodiment of the present invention is shown comprising a first bamboo frame member 1 and a second bamboo frame member 2. The first bamboo frame member 1 and the second bamboo frame member 2 each have one respective end beveled at 45° angle and then the beveled end of the first bamboo frame member 1 and the beveled end of the second bamboo frame member 2 are bonded together with an adhesive (not shown). A drill or machine tool is then used to make two parallel pin holes obliquely through the abutted end of the first bamboo frame member 1 and the abutted end of the second bamboo frame member 2, and then two pins 3 are respectively peripherally coated with a layer of an adhesive (not shown) and then fitted into the pin holes to enhance connection between the first bamboo frame member 1 and the second bamboo frame member 2.

Figure 7:
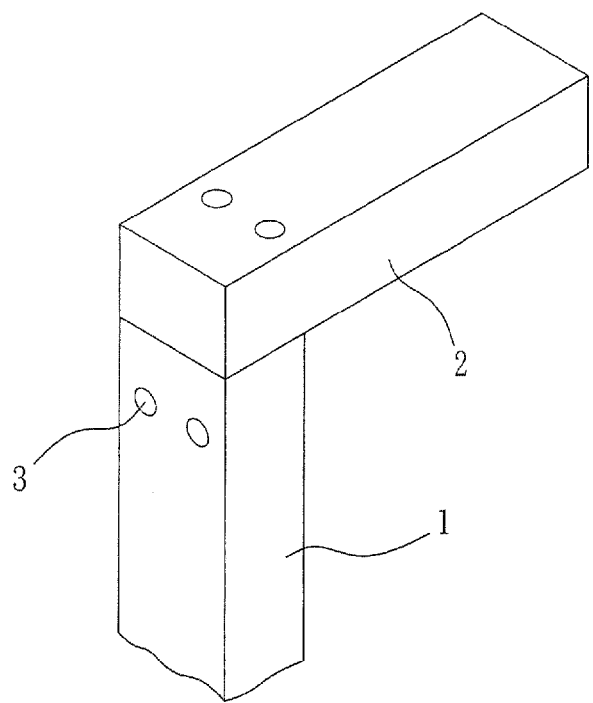
FIG. 7 is an oblique elevational of is an oblique elevation of a bamboo frame member mounting structure in accordance with a seventh embodiment of the present invention.
Figure 7A:
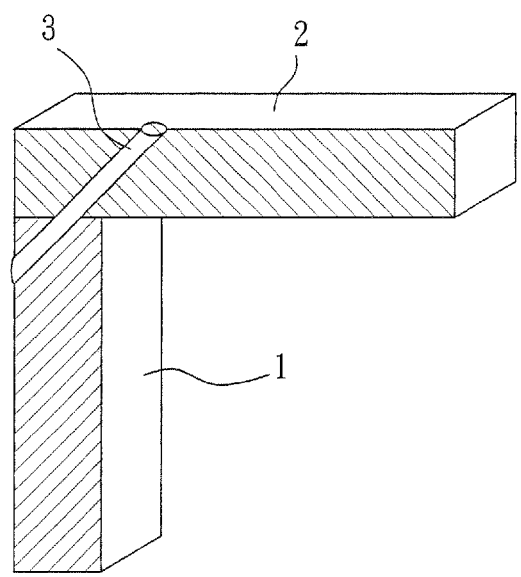
FIG. 7A is a sectional side view of FIG. 7.

Referring to FIGS. 7 and 7A, a bamboo frame member mounting structure in accordance with a seventh embodiment of the present invention is shown comprising a first bamboo frame member 1 and a second bamboo frame member 2. The second bamboo frame member 2 has one flat end thereof perpendicularly bonded to one flat end of the first bamboo frame member 1 with an adhesive (not shown) in a flush manner, and then a drill or machine tool is used to make two parallel pin holes obliquely through the connected ends of the first bamboo frame member 1 and second bamboo frame member 2, and then two pins 3 are respectively peripherally coated with a layer of an adhesive (not shown) and then fitted into the pin holes to enhance connection between the first bamboo frame member 1 and the second bamboo frame member 2.

Figure 8:
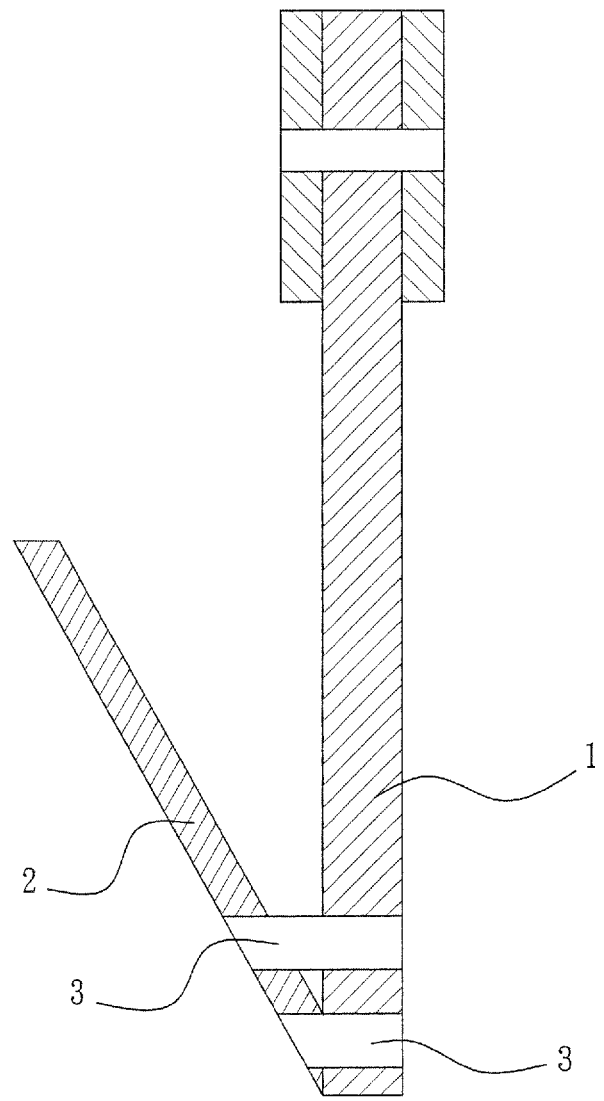
FIG. 8 is a sectional view of is an oblique elevation of a bamboo frame member mounting structure in accordance with an eighth embodiment of the present invention.

Referring to FIG. 8, a bamboo frame member mounting structure in accordance with an eighth embodiment of the present invention is shown comprising a first bamboo frame member 1 and a second bamboo frame member 2. The second bamboo frame member 2 has one beveled end thereof bonded to the periphery of one end of the first bamboo frame member 1 with an adhesive (not shown) in a flush manner, and then a drill or machine tool is used to make two parallel pin holes transversely across the first bamboo frame member 1 and the connected second bamboo frame member 2, and then two pins 3 are respectively peripherally coated with a layer of an adhesive (not shown) and then fitted into the pin holes to enhance connection between the first bamboo frame member 1 and the second bamboo frame member 2. The bamboo frame structure thus obtained works as a hook for hooking things.

Figure 8A:
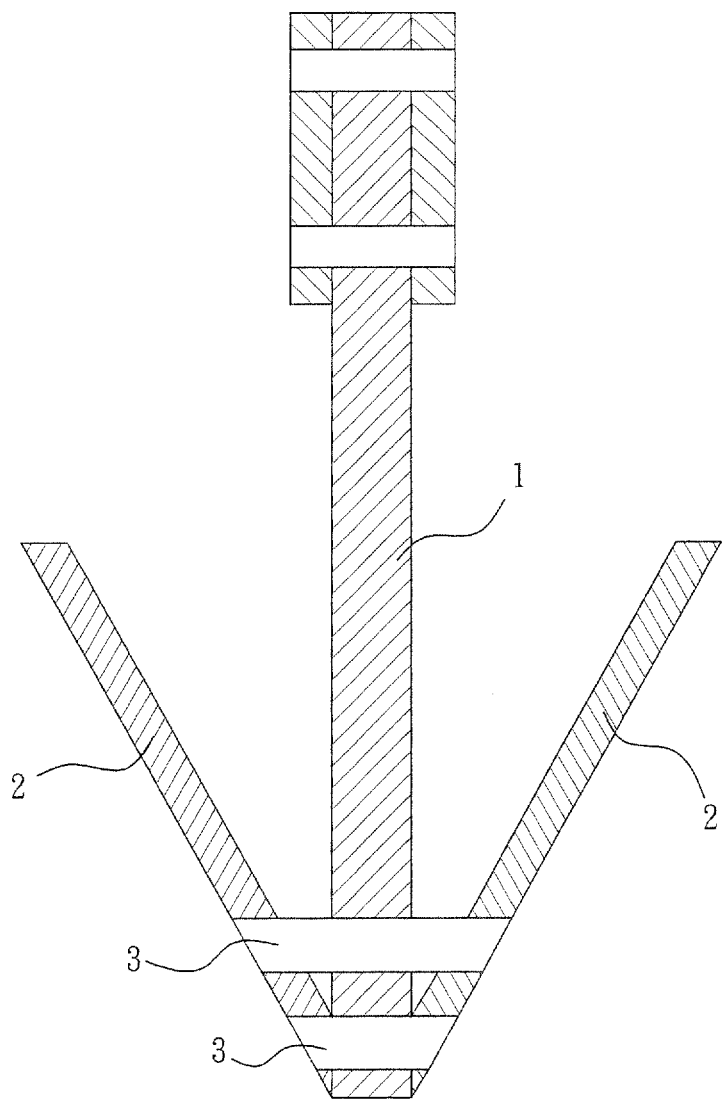
FIG. 8A is a sectional view of is an oblique elevation of a bamboo frame member mounting structure in accordance with a ninth embodiment of the present invention.

Referring to FIG. 8A, a bamboo frame member mounting structure in accordance with a ninth embodiment of the present invention is shown comprising a first bamboo frame member 1 and two second bamboo frame members 2. The second bamboo frame members 2 each have a respective beveled end respectively and bilaterally bonded to the periphery of one end of the first bamboo frame member 1 with an adhesive (not shown) in a flush manner, and then a drill or machine tool is used to make two parallel pin holes transversely across the first bamboo frame member 1 and the obliquely connected second bamboo frame members 2, and then two pins 3 are respectively peripherally coated with a layer of an adhesive (not shown) and then fitted into the pin holes to enhance connection between the first bamboo frame member 1 and the second bamboo frame members 2. The bamboo frame structure thus obtained works as a double-hook hanger for hooking things.

Figure 9:
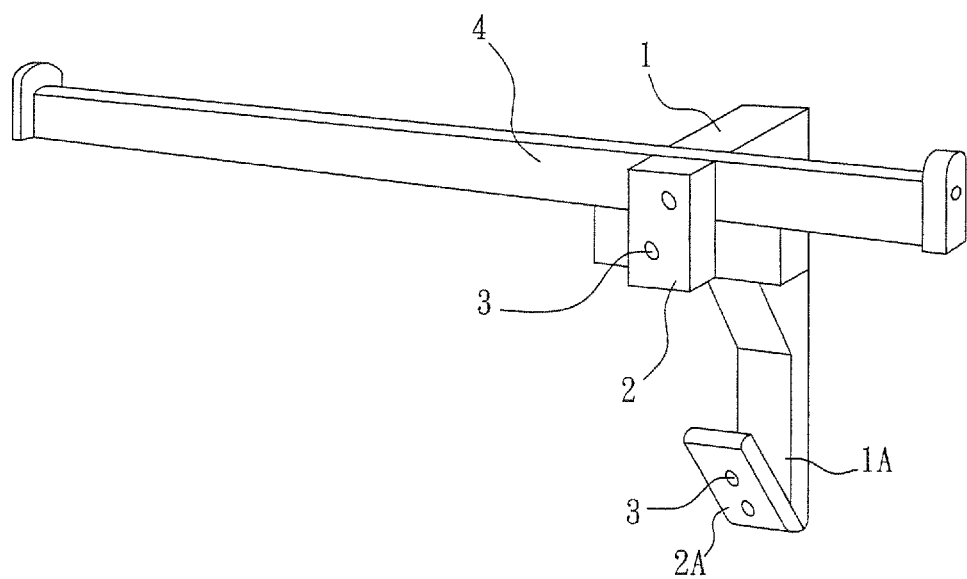
FIG. 9 is an elevational view of a bamboo frame member mounting structure in accordance with a tenth embodiment of the present invention.

Subject to the application of the aforesaid various embodiments of the present invention, multiple first bamboo frame members 1; 1' and second bamboo frame members 2; 2A can be fastened to a towel bar 4 and reinforced with pins 3 for hanging bathroom accessories, as shown in FIG. 9.

Figure 10:
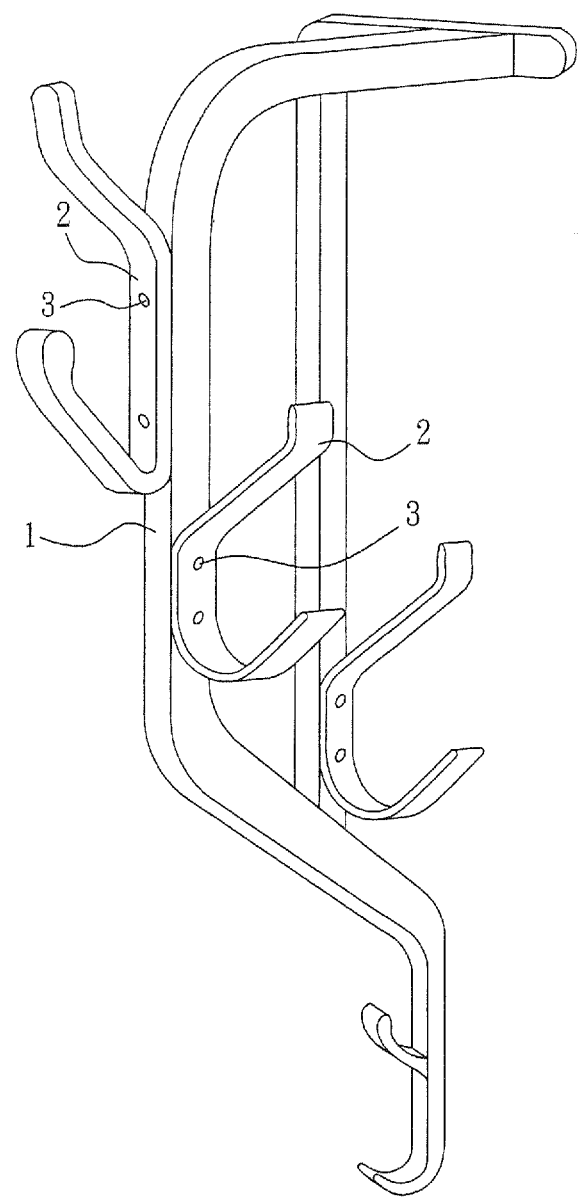
FIG. 10 is an elevational view of a bamboo frame member mounting structure in accordance with an eleventh embodiment of the present invention.

Subject to the application of the aforesaid various embodiments of the present invention, multiple first bamboo frame members 1; 1' and second bamboo frame members 2; 2A can be fastened together and reinforced with pins 3 to construct a clothe rack for hanging clothes and hats, as shown in FIG. 10.

Although particular embodiments of the invention have been described in detail for purposes of illustration, various modifications and enhancements may be made without departing from the spirit and scope of the invention. Accordingly, the invention is not to be limited except as by the appended claims.

I claim:

1. A bamboo frame structure comprising:
a first bamboo frame member;
a second bamboo frame member comprising a beveled surface contacting said first bamboo frame member;
a third bamboo frame member having a beveled surface contacting said first bamboo frame member;
a first pin comprising a first portion in a first hole in said first bamboo frame member, a second portion in a second hole in said second bamboo frame member and a third portion in a third hole in said third bamboo frame member, wherein said first portion is between said second and third portion; and
a second pin having a fourth portion in a fourth hole in said first bamboo frame member, a fifth portion in a fifth hole in said second bamboo frame member and a sixth portion in a sixth hole in said third bamboo frame member, wherein said fourth portion is between said fifth and sixth portion, a seventh portion is outside said fourth and fifth holes and between said fourth and fifth portions, and an eighth portion is outside said fourth and sixth holes and between said fourth and sixth portions.

2. The bamboo frame structure of claim 1, wherein said first pin is parallel with said second pin.

3. The bamboo frame structure of claim 1, wherein said first and second pins are coated with an adhesive material.

4. The bamboo frame structure of claim 1, wherein said first pin passes through said beveled surface of said second bamboo frame member and said beveled surface of said third bamboo frame member.

* * * * *